United States Patent
Qian

(10) Patent No.: US 11,922,285 B2
(45) Date of Patent: Mar. 5, 2024

(54) DIVIDING TRAINING DATA FOR AGGREGATING RESULTS OF MULTIPLE MACHINE LEARNING ELEMENTS

(71) Applicant: International Business Machines Corporation, Armonk, NY (US)

(72) Inventor: Haifeng Qian, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 442 days.

(21) Appl. No.: 17/343,339

(22) Filed: Jun. 9, 2021

(65) Prior Publication Data

US 2022/0398501 A1 Dec. 15, 2022

(51) Int. Cl.
  *G06F 16/55* (2019.01)
  *G06F 18/214* (2023.01)
  *G06F 18/2431* (2023.01)
  *G06N 3/08* (2023.01)
  *G06N 20/20* (2019.01)

(52) U.S. Cl.
  CPC ......... *G06N 20/20* (2019.01); *G06F 18/2148* (2023.01); *G06F 18/2431* (2023.01); *G06N 3/08* (2013.01)

(58) Field of Classification Search
  CPC .......... G06N 20/20; G06N 3/08; G06N 4/04; G06N 99/005; G06N 5/04; G06K 9/6257; G01V 1/28; G06F 21/602
  See application file for complete search history.

(56) References Cited

U.S. PATENT DOCUMENTS

| 5,809,212 A | 9/1998 | Shasha |
| 7,107,254 B1 | 9/2006 | Dumais |
| 7,742,641 B2 | 6/2010 | Ivanov et al. |

(Continued)

FOREIGN PATENT DOCUMENTS

| WO | 2012050252 A1 | 4/2012 |
| WO | 2020069051 A1 | 4/2020 |

OTHER PUBLICATIONS

Advisory Action received for U.S. Appl. No. 15/966,429 dated Oct. 27, 2021, 10 pages.

(Continued)

*Primary Examiner* — Phuoc H Doan
(74) *Attorney, Agent, or Firm* — Amin, Turocy & Watson, LLP

(57) ABSTRACT

Systems, computer-implemented methods, and computer program products to aggregate classifier result are provided. According to an embodiment, a system can comprise a memory that stores computer executable components and a processor that executes the computer executable components stored in the memory. The computer executable components can comprise a fractal dividing component that can train classifiers with fractally defined disjoint and non-disjoint subsets of training data comprising data with a first label and data with a second label. Further, the system can include training component that can train the group of classifiers with the fractally defined disjoint and non-disjoint subsets of training data. A fractal aggregating component can be included to generate a unified result of the classifiers by fractally aggregating results of classification by the ones of the classifiers, based on the subsets.

20 Claims, 12 Drawing Sheets

(56) References Cited

U.S. PATENT DOCUMENTS

| | | | |
|---|---|---|---|
| 9,443,192 B1 | 9/2016 | Cosic | |
| 9,477,906 B2 | 10/2016 | Roder et al. | |
| 2002/0010691 A1 | 1/2002 | Chen | |
| 2014/0201126 A1 | 7/2014 | Zadeh et al. | |
| 2016/0313463 A1* | 10/2016 | Wahrmund | G01V 1/30 |
| 2020/0195663 A1 | 6/2020 | Achituve et al. | |
| 2020/0241861 A1* | 7/2020 | Zhang | G06F 18/254 |

OTHER PUBLICATIONS

Non-Final Office Action received for U.S. Appl. No. 15/966,429 dated Dec. 14, 2021, 28 pages.

Kazemi ("ReINN: A Deep Neural Model for Relational Learning") The Thirty-Second AAAI Conference on Artificial Intelligence (AAAI-18) (Year: 2018).

Platanios ("Estimating Accuracy from Unlabeled Data") arXiv: 1705.07086v1 [cs.LG] May 19, 2017 (Year: 2017).

Komatani, et al., "Automatic Allocation of Training Data for Speech Understanding Based on Multiple Model Combinations," IEICE Trans. Inf. & Syst., vol. E95-D, No. 9 Sep. 2012, 10 pages.

Qian, "Fractal Divide and Fractal Aggregation," Proceedings of the 38 th International Conference on Machine Learning, PMLR 139, 2021. Copyright 2021 by the author(s), 9 pages.

Apr. 30, 2018, U.S. Appl. No. 15/966,429, 2019-0332917.

Final Office Action received for U.S. Appl. No. 15/966,429 dated Aug. 13, 2021, 32 pages.

Beretta, et al., "How Can Ontologies Give You Clue for Truth-Discovery? An Exploratory Study," 2016, ACM, 12 pages.

Friedman, et al., "Plausibility Measures and Default Reasoning," Journal of the ACM, vol. 48, No. 4, Jul. 2001, pp. 648-685.

Koulougli, et al., "Handling Query Answering in Crowdsourcing Systems: A Belief Function-Based Approach," 2016, IEEE, 4 pages.

Nagy, et al., "Uncertainty Handling in the Context of Ontology Mapping for Question-Answering," Last Accessed: Mar. 21, 2018, 8 pages.

Nagy, et al., "Multi-Agent Ontology Mapping with Uncertainty on the Semantic Web," 2007, IEEE, 8 pages.

Wan, et al., "Query Answering in Belief Logic Programming," Sep. 2009, LNAI 5785, 15 pages.

Zhao, et al., "Uncertainty and Rule Extensions to Description Logics and Semantic Web Ontologies," Advances in Semantic Computing (Eds. Joshi, Boley & Akerkar), vol. 2, pp. 1-22, 2010.

Chinese Office Action for Chinese Application No. 2019102577944.6 dated Nov. 25, 2022.

Notice of Allowance received for U.S. Appl. No. 15/966,429 dated Dec. 2, 2022, 24 pages.

Basir, "Connectionist-Based Dempster-Shafer Evidential Reasoning for Data Fusion," IEEE Transactions on Neural Networks, vol. 16, No. 6, Nov. 2005 (Year: 2005).

Non-Final Office Action received for U.S. Appl. No. 15/966,429 dated Jun. 9, 2021, 97 pages.

Denoeux, Thierry, A Neural Network Classifier Based on Dempster-Shafer Theory, IEEE Transactions on Systems, Man, and Cybernetics—Part A: Systems and Humans, vol. 30, No. 2, Mar. 2, pp. 131-150.

Denoeux, Thierry., "Modeling vague beliefs using fuzzy-valued belief structures", Fuzzy Sets and Systems vol. 116, 2000, pp. 167-199.

Lefevre et al., "Using Information Criteria in Dempster-Shafer's Basic Belief Assignment", IEEE International Fuzzy Systems Conference Proceedings, Aug. 22-25, 1999 , 06 pages.

Rui et al., "A Novel Fuzzy Neural Network: The Vague Neural Network", School of Computer Science and Technology, 2005, 06 pages.

Final Office Action received for U.S. Appl. No. 15/966,429 dated May 5, 2022, 27 pages.

Non-Final Office Action received for U.S. Appl. No. 15/966,429 dated Aug. 4, 2022, 25 pages.

\* cited by examiner

DIVIDING TRAINING DATA FOR AGGREGATING RESULTS OF MULTIPLE MACHINE LEARNING ELEMENTS

BACKGROUND

The embodiments described herein relate to machine learning, and more specifically, to combining the operation of different machine learning elements.

As machine learning technologies continue to develop, the uses for which the technologies are applied increasingly implicate higher levels of accuracy in the results generated by applied systems. In addition, as machine learning systems are more widely used inaccuracy in results can increase, not only because of the diversity of concepts that are analyzed, but also because actors acting as adversaries to certain systems are intentionally trying to cause inaccuracies in the operation of some machine learning systems.

One existing approach that has been used to try to increase the accuracy of machine learning systems uses multiple machine learning elements to analyze problems, then uses the results from the operation of the elements to generate an output for the system. In one approach, several mini-classifiers having different features are trained with a data set, then upon use, their results are combined by different approaches, including the evaluating of how many classifiers generated the same result.

Problems with current machine learning approaches include the ease with which the combined results of classifiers can change. For example, when a particular image analyzed includes a frequently occurring feature, it can be likely that a majority of machine learning elements will be trained to rank the particular feature as significant. Unfortunately, when this feature isn't present, e.g., based on an adversary concealing the feature, existing approaches of combining results can be rendered inaccurate by the erroneous classification results from multiple elements.

Thus, problems with existing approaches include generalizing features that appear on many, but not all data used for training, and further include the simplistic approaches used to combine data from multiple machine learning elements, e.g., prioritizing results from the majority applied machine learning elements, in many circumstances.

SUMMARY

The following presents a summary to provide a basic understanding of one or more embodiments of the invention. This summary is not intended to identify key or critical elements, nor delineate any scope of the particular embodiments or any scope of the claims. Its sole purpose is to present concepts in a simplified form as a prelude to the more detailed description that is presented later. In one or more embodiments described herein, systems, devices, computer-implemented methods, and computer program products that divide and allocate training data to, and aggregate results of, multiple classifiers of a neural network.

For example, according to an embodiment, a system can comprise a memory that stores computer executable components and a processor that executes the computer executable components stored in the memory. The computer-executable components can comprise a fractal dividing component that can train ones of a group of classifiers with fractally defined disjoint and non-disjoint subsets of training data comprising data with a first label and data with a second label. Further, the system can include training component that, in some embodiments can train the group of classifiers with the fractally defined disjoint and non-disjoint subsets of training data. Compared to existing approaches of training multiple classifiers, an advantage of fractally dividing training data among classifiers is that each classifier can be trained to provide results based on different combinations of training data.

The system can further include a fractal aggregating component that can generate a unified result of the group of classifiers by fractally aggregating results of classification by the ones of the group of classifiers, based on the disjoint and non-disjoint subsets. An advantage of the use of the fractal aggregating component to aggregate results of the group of classifiers is that fractal aggregation of the results of classifiers trained based on fractally divided training data can result in more robust results than existing approaches combining the results of multiple classifiers.

According to another embodiment, a computer-implemented method can comprise training, by a device operatively coupled to a processor, ones of a group of classifiers with fractally defined disjoint and non-disjoint subsets of training data comprising data with a first label and data with a second label. The computer-implemented method can further include generating, by the device, a unified result of the group of classifiers by fractally aggregating results of classification by the ones of the group of classifiers, based on the disjoint and non-disjoint subsets.

According to additional embodiments, a computer program product that can aggregate classifier results is provided. The computer program product can comprise a computer readable storage medium having program instructions embodied therewith, the program instructions executable by a processor to cause the processor to train ones of the ensemble of subtask classifiers with fractally defined disjoint and non-disjoint subsets of training data comprising data with a first classification and data with a second classification.

In one or more embodiments the instructions can further generate a unified result of the ensemble of subtask classifiers by fractally aggregating results of classification by the ones of the ensemble of subtask classifiers, based on the disjoint and non-disjoint subsets. An advantage of such a computer program product is that, by the fractal division of training data, it can be implemented to provide an environment whereby multiple subtask classifiers can be trained by a variety of different combinations of characteristics of different labels. As discussed further herein, such an approach can improve the accuracy of some or more embodiments over existing approaches having undivided sets of training data.

In some embodiments, the program instructions are further executable by the processor to cause the processor to identify results of classification by the ones of the ensemble of subtask classifiers as a first measure of likelihood that an analyzed input comprises content of the first classification and a second measure of likelihood that the analyzed input comprises content of the second classification. Advantages of the results of classifiers being likelihood values include the combined results of the classifiers also being expressed as a likelihood.

Other embodiments may become apparent from the following detailed description when taken in conjunction with the drawings.

DETAILED DESCRIPTION

Figure 1:
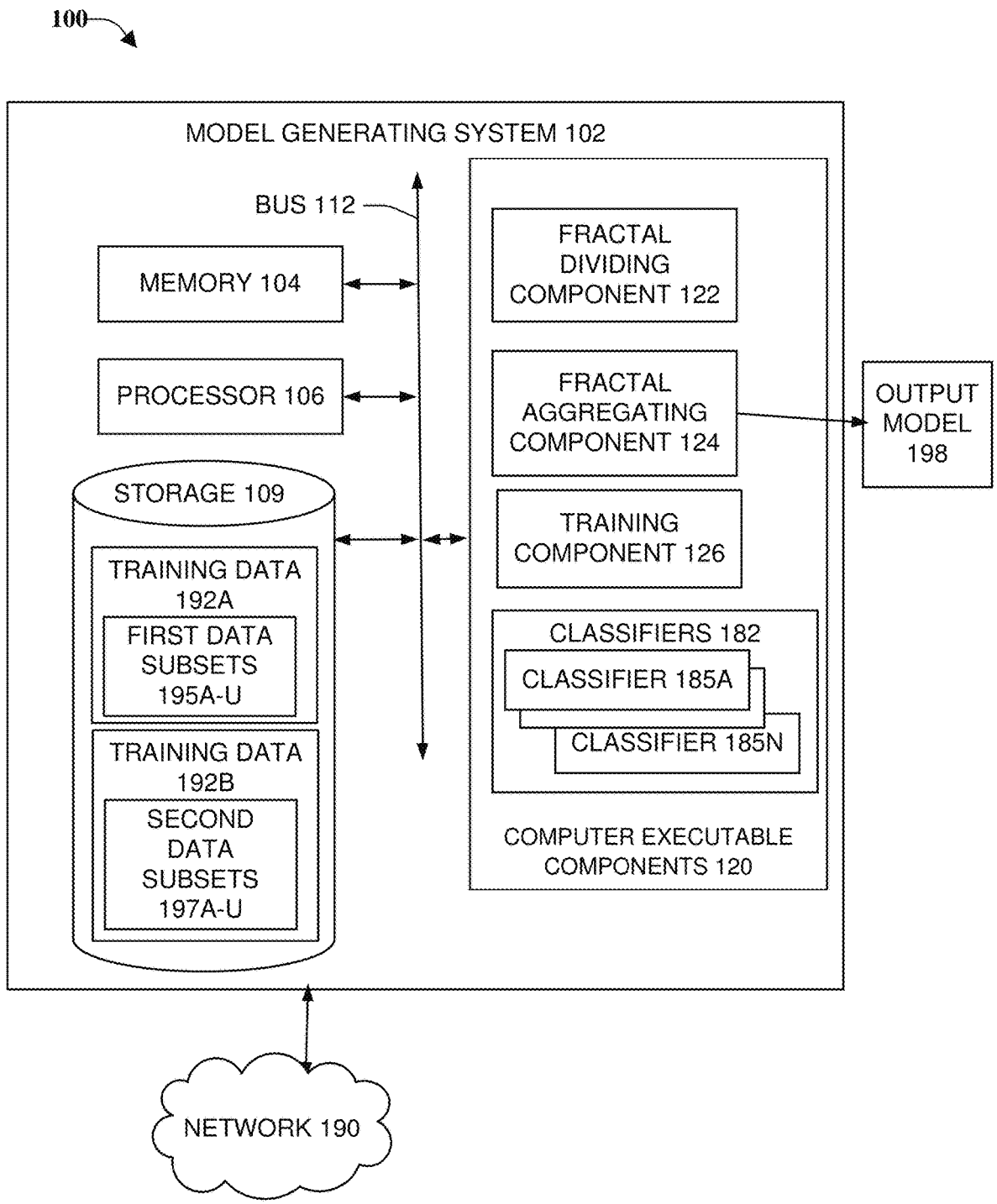
FIG. 1 illustrates a block diagram of an example, non-limiting system that can provide an integrated result from multiple classifiers, in accordance with one or more embodiments described herein.

The following detailed description is merely illustrative and is not intended to limit embodiments and application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, an entity can comprise a computing device, a software application, a machine, a human, a client, a user, an agent, a machine learning model, an artificial intelligence, and other similar concepts. It should be appreciated that such an entity can implement one or more of the embodiments described herein. An example entity described by one or more embodiments described here is model generating system 102, described below.

Given the problems described above with existing machine learning technologies, one or more embodiments described herein can be implemented to produce a solution to the problems described above in the form of systems, computer-implemented methods, and/or computer program products that can further improve machine learning technologies, by implementing computer implemented embodiments that include, but are not limited to, the collection and use of training data for machine learning, the operation of classifier elements, the manipulation of training data for use by multiple parallel classifiers, the generation of results by a classifier, and the integration of the results of multiple parallel classifiers into a unified result, processes to transform collections of training data into selected subsets of data allocated to configure and modify elements of machine learning systems, perform computerized analysis of elements of machine learning systems to generate component output models that can improve the operation of the machine learning systems, and in other limited areas described and suggested by one or more embodiments herein. Advantages of such systems, computer-implemented methods, and computer program products include that, when implemented, embodiments can improve the accuracy of machine learning results and improve the security of machine learning systems against ever increasing adversarial challenges.

Generally speaking, one or more embodiments can solve problems with existing approaches described by one or more embodiments that derive multiple training sets from training data, and train multiple parallel classifiers based on different derived training sets per classifier. Further, the results of the multiple parallel classifiers can be combined based on the respective combinations of training data that was used to train the classifiers. Some approaches described herein can aggregate the operation of the trained classifiers and, at inference time, combining results from the classifiers in a way that can reduce the likelihood of classification errors compared to existing approaches.

FIG. 1 illustrates a block diagram of an example, non-limiting system 100 that can provide an integrated result from multiple classifiers, in accordance with one or more embodiments described herein. Repetitive description of like elements and processes employed in respective embodiments is omitted for sake of brevity.

In one or more embodiments, system 100 can include model generating system 102, network 190, and other components associated with classifying systems as described herein with or without reference to the various figures of the one or more embodiments described herein. In one or more embodiments, model generating system 102 can include bus 112 that can enable components including, but not limited to, memory 104, processor 106, storage 109, fractal dividing component 122, fractal aggregating component 124, training component 126, classifiers 182, and other components associated with classifying systems as described herein with or without reference to the various figures of the one or more embodiments described herein.

Storage 109 can store training data 192A-B, which can be divided, by one or more embodiments, into first data subsets 195A-U and second data subsets 197A-U respectively, with first data subsets 195A-U including, as discussed with FIG. 2 below, neural network training documents 1-500. In one or more embodiments, different approaches can be employed to divide training documents into subsets (e.g., first data subsets 195A-U) for allocating to particular classifiers 182. Generally speaking, one or more embodiments divide training data so as to have respective classifiers trained by data with different characteristics, thereby learning different knowledge.

In one or more embodiments data can be divided into sets until classifiers cannot distinguish between them to an implementation specific level. For example, a characteristic that can be used to separate visual representations of objects is the color of an object, e.g., a training dataset of dogs can be divided into black dogs, brown dogs, white dogs, gray dogs, etc. It is appreciated that one or more embodiments can divide training data based on approaches ranging from the simple, color characteristic to approaches such as K-means clustering. In the example discussed with FIGS. 2-5 below, training data sets of pictures of "4" and pictures of "9," can be divided based on different characteristics, including, but not limited to, letter color, paper color, handwritten or printed, and lined or unlined paper. In different implementations, a number of color subsets can be selected, until classifiers with training data different allocated characteristics cannot distinguish between the colors to a selected degree, e.g., dark blue, medium blue, and turquoise groups may subsets be too specific to provide useful subsets for embodiments. One having skill in the relevant art(s), given the descriptions herein, will appreciate that, notwithstanding the simple explanation of division based on colors, the composition of subsets, mutually exclusive to each other, can be based on clustering approaches implemented by machine learning elements, and further, that this clustering can occur during the training of the multiple parallel classifiers as discussed herein. It will further be understood that, based on factors including, but not limited to, the results of the training data division, training, and aggregation, one or more embodiments can recluster the training data into different training subsets, e.g., to further goals of the embodiments.

It should be appreciated that the embodiments described and depicted in various figures disclosed herein, are for illustration only, and as such, the architecture of such embodiments are not limited to the systems, devices, and components depicted therein. For example, in some embodiments, system 100, model generating system 102 and other similar elements described herein, can further comprise various computer and computing-based elements described herein with reference to operating environment 1000 and FIG. 10. In several embodiments, such computer and computing-based elements can be used in connection with implementing one or more of the systems, devices, components, and computer-implemented operations shown and described in connection with FIG. 1 and other figures disclosed herein.

In one or more embodiments, memory 104 can store one or more computer and machine readable, writable, and executable components and instructions that, when executed by processor 106 (e.g., a classical processor, a quantum processor, etc.), can perform operations defined by the executable components and instructions. For example, memory 104 can store computer and machine readable, writable, and executable components and instructions that, when executed by processor 106, can execute the various functions described herein relating to model generating system 102, fractal dividing component 122, fractal aggregating component 124, training component 126, and other components associated with to model generating system 102 as described herein with or without reference to the various figures of the one or more embodiments described herein.

Memory 104 can comprise volatile memory (e.g., random access memory (RAM), static RAM (SRAM), dynamic RAM (DRAM), etc.) and non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and other components of FIG. 10, described below. Such examples of memory 104 can be employed to implement any of the embodiments described herein.

Processor 106 can comprise one or more types of processors and electronic circuitry (e.g., a classical processor, a quantum processor, etc.) that can implement one or more computer and machine readable, writable, and executable components and instructions that can be stored on memory 104. For example, processor 106 can perform various operations that can be specified by such computer and machine readable, writable, and executable components and instructions including, but not limited to, logic, control, input/output (I/O), arithmetic, and the like. In some embodiments, processor 106 can comprise one or more central processing unit, multi-core processor, microprocessor, dual microprocessors, microcontroller, System on a Chip (SOC), array processor, vector processor, quantum processor, and another type of processor. Further examples of processor 106 are described below with reference to processing unit 1014 and other components of FIG. 10, described below. Such examples of processor 106 can be employed to implement any embodiments described herein. As discussed further below, by improving the accuracy of classifying results and making results less likely to be affected by adversarial challenges, one or more embodiments provide technical improvements to processor 106 and how this component facilitates the operation of model generating system 102.

It should be noted that, when an element is referred to herein as being "coupled" to another element, it can describe one or more different types of coupling. For example, when an element is referred to herein as being "coupled" to another element, it can be described one or more different types of coupling including, but not limited to, chemical coupling, communicative coupling, capacitive coupling, electrical coupling, electromagnetic coupling, inductive coupling, operative coupling, optical coupling, physical coupling, thermal coupling, and another type of coupling.

Model generating system 102, and any component of model generating system 102 as described herein, can be communicatively, electrically, operatively, and optically coupled to one another via a bus 112 to perform functions of system 100, model generating system 102, and any components coupled therewith. Bus 112 can comprise one or more memory bus, memory controller, peripheral bus, external bus, local bus, a quantum bus, and another type of bus that can employ various bus architectures. Further examples of bus 112 are described below with reference to system bus 1018 and FIG. 10. Such examples of bus 112 can be employed to implement any of the embodiments described herein.

Functional components described herein, including model generating system 102 can comprise any type of component, machine, device, facility, apparatus, and instrument that comprises a processor and can be capable of effective and operative communication with a wired and wireless network. All such embodiments are envisioned. For example, model generating system 102 can comprise a server device, a computing device, a general-purpose computer, a special-purpose computer, a quantum computing device (e.g., a quantum computer), a tablet computing device, a handheld device, a server class computing machine and database, a laptop computer, a notebook computer, a desktop computer, a cell phone, a smart phone, a consumer appliance and instrumentation, an industrial and commercial device, a digital assistant, a multimedia Internet enabled phone, a multimedia players, and another type of device.

One or more examples herein include references to machine learning elements such as classifiers 182, also termed herein machine learning components, multiple parallel classifiers, subtasks, and subtask classifiers. Also, one or more examples herein include combining results of subtask classifiers, and these subtask classifiers can be termed ensembles of classifiers. It is understood that descriptions of embodiments that reference specific machine learning elements, such as classifiers, are non-limiting, and can broadly be applied to artificial intelligence components that generate classifications, correlations, inferences and/or expressions associated with principles of artificial intelligence. For instance, system components can employ an automatic classification system and/or an automatic classification process that employs a probabilistic, statistical-based analysis to generate results discussed with examples herein.

One or more embodiments can employ any suitable machine-learning based techniques, statistical-based techniques and/or probabilistic-based techniques. For example, one or more embodiments can employ technologies including, but not limited to, expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. For example, one or more embodiments can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and a set of different machine learning computations.

In some embodiments, model generating system 102 can be coupled (e.g., communicatively, electrically, operatively, optically, etc.) to one or more external systems, sources, and devices (e.g., classical and quantum computing devices, communication devices, etc.) via network 190. In some embodiments, network 190 can comprise wired and wireless networks, including, but not limited to, a cellular network, a wide area network (WAN) (e.g., the Internet) or a local area network (LAN). For example, model generating system 102 can communicate with one or more external systems, sources, and devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and other proprietary and non-proprietary communication protocols. In such an example, model generating system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that communicates information between model generating system 102 and external systems, sources, and devices (e.g., computing devices, communication devices, etc.).

In one or more embodiments described herein, model generating system 102 can perform (e.g., via processor 106) operations including, but not limited to, dividing training data 192A-B into first data subsets 195A-U and second data subsets 197A-U respectively (e.g., with fractal dividing component 122), using training data 192A-B subsets to train classifiers 182 (e.g., via training component 126), and using a fractal approach to aggregating results of classifiers 182 into output model 198, e.g., via fractal aggregating component 124. In one or more embodiments, classifiers 182 can include classifiers 185A-N. In one or more embodiments, fractal aggregating component 124 can generate and modify output model 198, as discussed with FIGS. 2-5 below.

In one or more embodiments, computer and/or computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining fractal dividing component 122. Example operations that fractal dividing component 122 can facilitate for model generating system 102 include training ones of a group of classifiers with fractally defined disjoint and non-disjoint subsets of training data comprising data with a first label and data with a second label. For example, in one or more embodiments, fractal dividing component 122 can train ones of a group of classifiers 182 with fractally defined disjoint and non-disjoint subsets of training data 192A-B comprising data with a first label and data with a second label, e.g., training set of images of "9" 230A being label II training data, and training set of images of "4" being class I training data.

The computer executable components 120 of model generating system 102 can further comprise fractal aggregating component 124 that, can generate a unified result of the group of classifiers by fractally aggregating results of classification by the ones of the group of classifiers, based on the disjoint and non-disjoint subsets. Such will be discussed in greater detail with reference to FIGS. 2-5 and the accompanying text below. The computer executable components 120 of model generating system 102 can further comprise a training component 126 that can train the group of classifiers with the fractally defined disjoint and non-disjoint subsets of training data. Such will be discussed in greater detail with reference to FIGS. 3-6 and the accompanying text.

Figure 2:
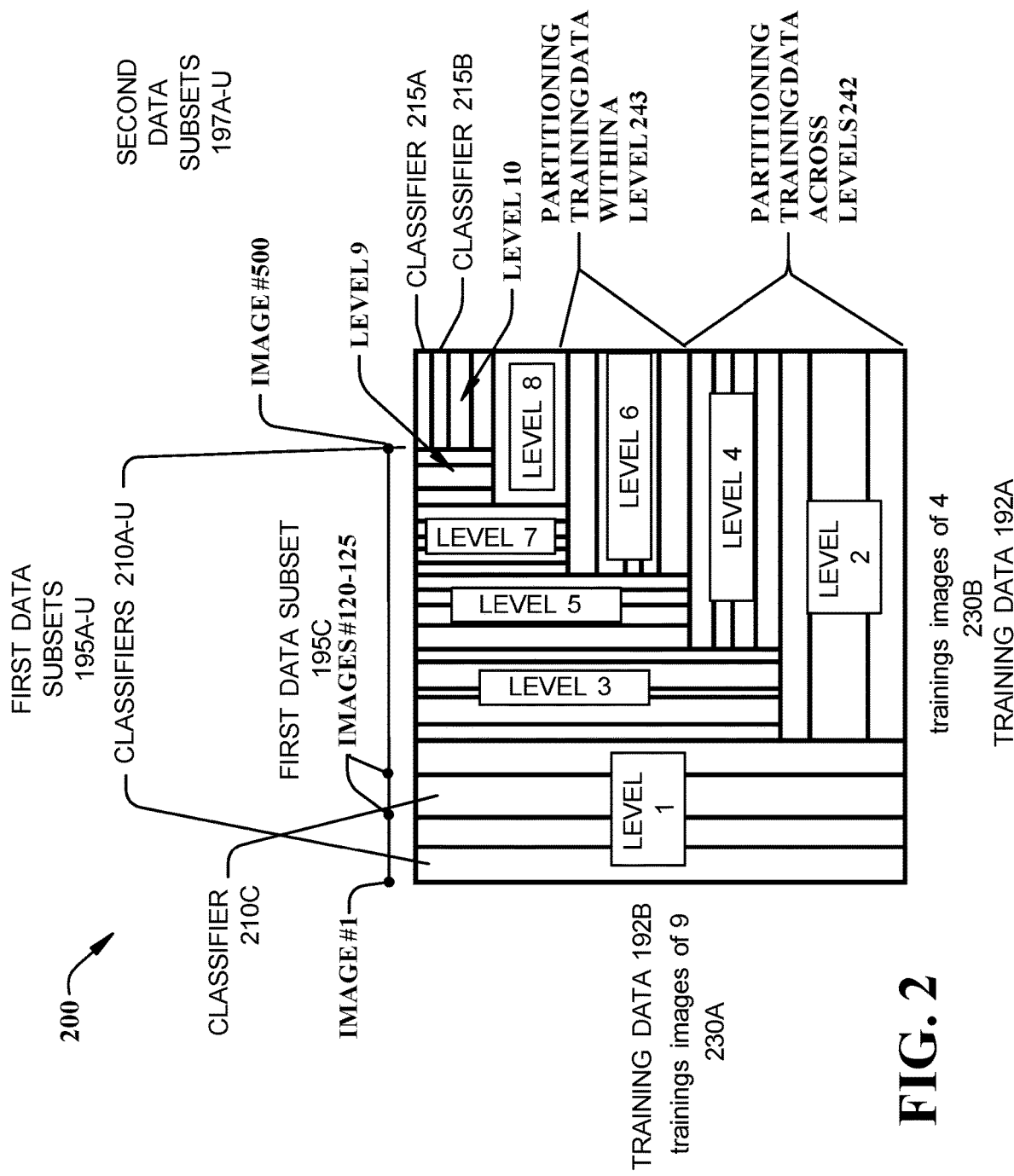
FIGS. 2 and 3 illustrate non-limiting example diagrams that depict an approach to dividing training data among classifiers, in accordance with one or more embodiments described herein.
Figure 3:
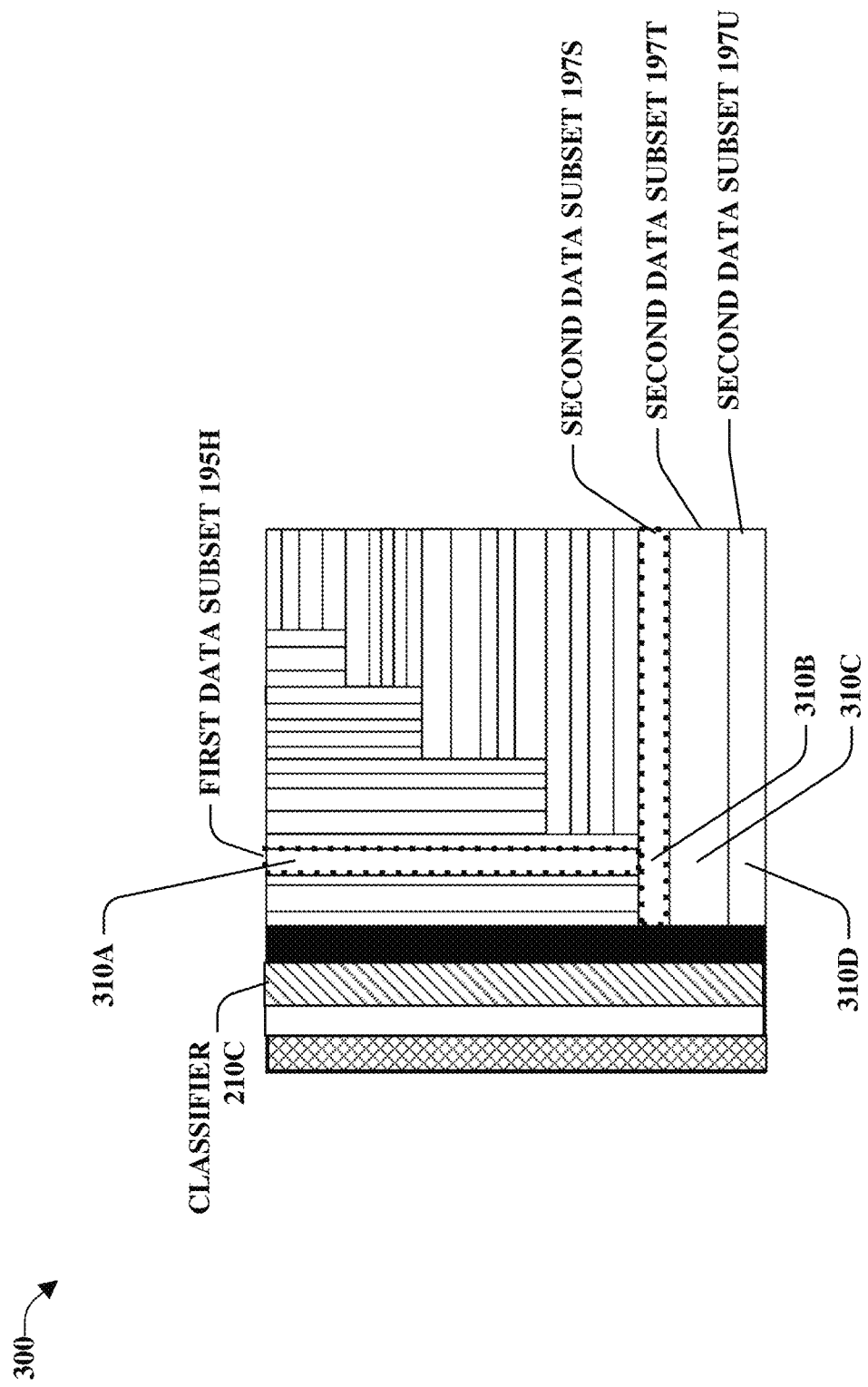

FIGS. 2 and 3 respectively illustrate example, non-limiting diagrams 200 and 300 that depict an approach to dividing training data 192A-B among classifiers 182, in accordance with one or more embodiments described herein. Repetitive description of like elements and processes employed in respective embodiments is omitted for sake of brevity. Generally speaking, diagrams 200 and 300 are two-dimensional grids where each x-coordinate corresponds to a datum with a first label, and each y-coordinate corresponds to a datum with a second label, these labels in some embodiments being alternative selections for a binary classifier, such as distinguishing a "4" from a "9."

As illustrated in diagram 200, training data 192A can be divided into first data subsets 195A-U for respective classifiers 210A-U, and training data 192B can be divided into first data subsets 197A-U for respective classifiers 215A-U. In an example where training data 192A includes images to be classified, first data subset 195C can include five images (e.g., images #120-125) and be allocated to train classifier 210C. FIG. 1 illustrates an example of fractal divide. There are a total of 21 rectangles in FIG. 1 and they collectively cover the entire region with no overlap. In other words, any pair of training data with opposite labels appears in one and only one of the training subsets, and no data pair gets contrasted twice.

Continuing this example, classifiers 182 can perform a binary classification by labeling images as including a "4" or a "9," with each training image having one or the other number depicted. The complete set of training data in this example includes training data 192B having training images of "9," and training data 192A having training images of "4." Each data subset depicted in diagram 200 includes a different combination of data from both training data 192A-B, with each combination illustrated by a rectangular fractal, e.g., first data subset 195C includes a full set of all the training images of training data 192B (e.g., training images of "9") and a particular subset (e.g., images #120-125) of the images depicted a "4," in training data 192A.

In one or more embodiments, the subsets allocated to classifiers 210A-D can be termed first-level training subsets, e.g., each of first data subsets 195A-D can be a subtask to distinguish all of the training data with label II (e.g., training set of images of "9" 230A) against different subset of data with label I, e.g., training set of images of "4" 230B.

Moving to FIG. 3, example, non-limiting diagram 300 can illustrate combinations of training data 192A-B that can be allocated to a second level of training subsets, e.g., second data subsets 197S-U, e.g., each being a subtask to distinguish the same set of data with label I (e.g., ones excluded from the first level) against a different subset of data with label II. In one or more embodiments, the approach described above continues until a five-level fractal structure of training data 192A-B is allocated to classifiers 182.

In one or more embodiments, embodiments of the fractal division process can have any number of fractal levels. In one approach, a number of fractal levels can be selected based on an analysis of the generalization properties of the subsets of data, e.g., the data separation based on criteria lower than a threshold of generalization. It would be appreciated by one having skill in the relevant art(s), given the description herein that data separation can be achieved and measured using a variety of approaches. As noted above, one or more embodiments can divide training data based on distinguishing characteristics, e.g., from using approaches ranging from a division based on color to statistical approaches, such as K-means clustering.

As noted above, one or more embodiments can divide training data based on approaches ranging from the simple, color characteristic to approaches such as K-means clustering. In the example discussed with FIGS. 2-5, training data sets of pictures of "4" and pictures of "9," can be divided based on different characteristics, including, but not limited to, letter color, background color, handwritten or printed, and lined or unlined paper. In different implementations, a number of color subsets can be selected, until classifiers with training data different allocated characteristics cannot distinguish between the colors to a selected degree, e.g., dark blue, medium blue, and turquoise groups may subsets be too specific to provide useful subsets for embodiments.

In one or more embodiments, implementation parameters can be selected by embodiments based on different implementation considerations, such as the accuracy of results produced for a particular data set, and the performance of the implemented system, e.g., energy consumed, speed of execution, and administration required for operation. For example, in some implementations, the number of disjoint subsets to create for a training data set can be determined based on a selected level of data separation for the subsets. In some implementations increasing the data separation of the subsets (e.g., dividing training data into more, smaller, subsets) can improve performance by reducing the size of the data analyzed by each classifier.

Further, in the example depicted, diagram 300 has ten (10) levels labeled, with this approach to numbering levels being non-limiting. In one or more embodiments, the number of levels for an implementation can based the number of subsets generated from the training data, and characteristics of the aggregated classifiers used to analyze the subsets. For example, for particular classifiers, accuracy and performance can be affected based on whether the classifier operates in level 1 (e.g., all of the available training data for one label and a subset of data for another label) or another level, e.g., analysis of less training data for the one label. As depicted in FIG. 2, each of the ten levels includes from three (e.g., level 2) to six subsets per level (e.g., level 3). It is important to note that one or more embodiments can adjust different parameters of operation (e.g., composition of subsets, number of levels to use to group subsets, degree of data separation of data in different subsets) based on system performance, e.g., accuracy and performance.

In some implementations, building fractal output model 198 can employ approaches to partitioning training data across levels 242 (e.g., levels 2 and 4) and within a level 243 (e.g., level 6). For example, as depicted, LEVEL 2 includes a subsets of training data 192B (e.g., second data subset 197S-U), while level 2 classifiers analyze the same subset of training data 192A. It is important to note that, in one or more embodiments, cross-level partitioning of training data can also be updated periodically during training.

In additional embodiments, for partitioning across levels 242, two one-level fractal structures can be trained by one or more embodiments, with a first being a $K_1$ classifier that trains based on all label II data, and on disjoint sets of label I training data, and a second can be a $K_2$ classifier that trains based on all label I data, and on disjoint sets of label II training data.

Continuing the example discussed with FIG. 2 above, as depicted by a dotted box, the training data allocated to classifier 210H can include portion 310A of training set of images of "9" 230A and portion (e.g., first data subset 195H) of images of "4" 230B. Thus, as labeled, first data subset 195H allocated to classifier 210H, can include portion 310A having a smaller set of training set of images of "9" 230A than the level one classifiers and a larger set of training images for images of "4" 230B than, e.g., second data subsets 197S-U are labeled portions 310B-D respectively. Given the description above, one having skill in the relevant art(s), appreciates how the remaining of first data subsets 195A-U and second data subsets 197A-U are allocated to classifiers 210A-C and 215A-U. As noted above, classifiers 182 can have different algorithms that can be used to label the two numbers, and based on one or more embodiments, each of the algorithms can be trained by selected combinations of training data 192A-B, e.g., also termed derived training subsets of data herein.

In one or more embodiments, training sets can be formed recursively until all training data are used, with each "4" "9" pair appearing in one training set. In another variation, data subsets of training data 192A-B can be formed dynamically, e.g., while training is performed on the classifiers by the portions of training data. It should be noted that, one or more embodiments can benefit from combining training data differently for each level. For example, for classifiers oriented vertically in the diagram (e.g., levels 1, 3, 5, 7, and 9), classifiers are aggregated that have been trained on the same subset of data with training images of "9" 230A and disjoint subsets of training data from training images of "4," in accordance with one or more embodiments, with the opposite characteristics describing the horizontally oriented levels 2, 4, 6, 8, and 10.

Figures 4A, 4B:
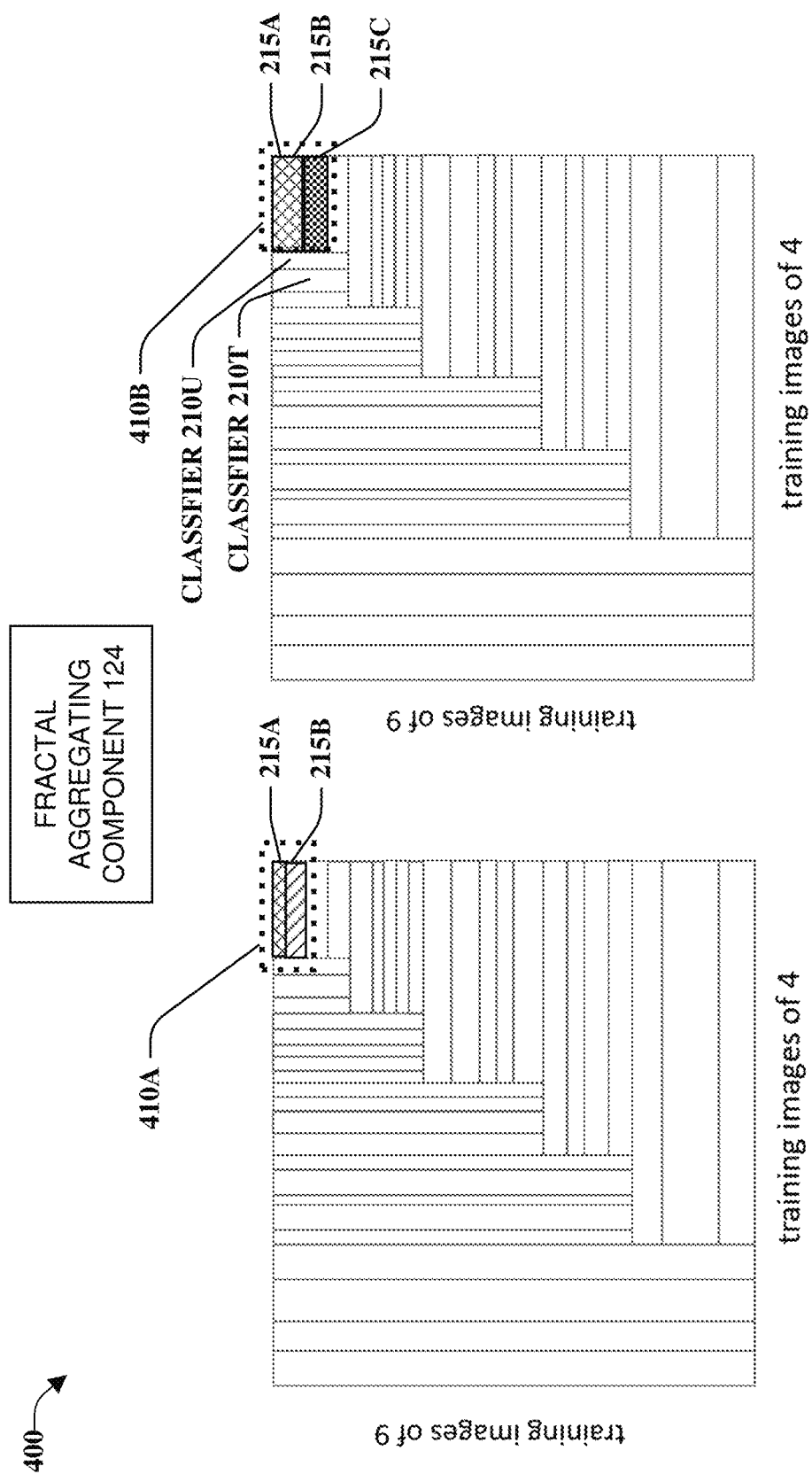
FIGS. 4A and 4B illustrate a block diagram of an example that uses fractal aggregation to combine the results of multiple classifiers, in accordance with one or more embodiments described herein.

FIGS. 4A-4B illustrate a block diagram of an example 400 that uses fractal aggregation to combine the results of multiple classifiers, in accordance with one or more embodiments described herein. Repetitive description of like elements and processes employed in respective embodiments is omitted for sake of brevity. As discussed above, FIG. 4A depicts fractal representation 400 of training data 192A-B allocated to classifiers 215A-U, e.g., classifiers 215A-B of LEVEL 10 that are labeled (with the data allocated thereto highlighted with distinctive shading in FIG. 4A).

Generally speaking, in one or more embodiments, fractal aggregation can systematically combine the results of multiple classifiers 182. In one or more embodiments, fractal aggregation can retrace some of the processes of fractal division described with FIGS. 2-3 above, e.g., the subtasks of the classifiers in the last level are first combined into a first aggregated classifier. In this example, fractal aggregating component 124 can identify trained classifiers 215A-B as a part of the highest level, e.g., LEVEL 10 in this example.

As described in detail with FIG. 5 below, the results of classifiers 215A-B can be combined into aggregated classifier 410A. As discussed in detail with FIG. 8 below, in one or more embodiments, during operation of aggregated classifier, classifiers 215A-B continue to receive and analyze inputs in parallel, with each generating a result. Based on the results of all aggregated classifiers, the aggregation process can act to combine the results of classifiers 215A-B into a single result. With FIG. 8 below, an example implementation of one or more embodiments in a vehicle is discussed, e.g., performing rapid analysis of vehicle operation data with high levels of accuracy.

Based on the initial aggregation of a portion of LEVEL 10 described above, one having skill in the relevant art(s), given the descriptions herein, will appreciate that, as depicted in FIG. 4B, aggregated classifier 410A results can be combined with the next remaining element of LEVEL 9, e.g., classifier 215C. With FIG. 5 below, example expressions are provided that that describe how the two results (e.g., aggregated classifier 410A and classifier 215C) can be combined based on the respective combinations of data used to train the component classifiers of aggregated classifier 410A and classifier 215C.

Continuing with this description of the fractal aggregation depicted in FIGS. 4A-4B, a next aggregation can result in aggregated classifier 410B, e.g., combining the results of individual classifiers 214A-C into a single aggregated result. In one or more embodiments, using the fractal aggregation approaches described herein, the remaining classifier of LEVEL 10 (e.g., classifier 215D, not labeled), classifiers 215A-D of LEVEL 10 can all operate to analyze input data, with the results being combined into a single result. Continuing this description of some embodiments of the fractal aggregation process described herein, once LEVEL 10 is aggregated, fractal aggregating component 124 can select a classifier from the LEVEL 9 classifiers for aggregating with the LEVEL 10 classifiers (e.g., classifier 210U), with the process continuing with the fractal aggregation of the remaining classifiers of LEVEL 9, e.g., classifiers 210S-U.

It should be noted that, although some examples discussed herein have two-dimensions of fractally divided data, this is non-limiting, with any number of dimensions being able to be incorporated into the approach, e.g., after aggregating classifiers from the X and Y axes, in one or more embodiments, fractal aggregating component 124 can select for aggregation a classifier from a Z axis.

Figure 5:
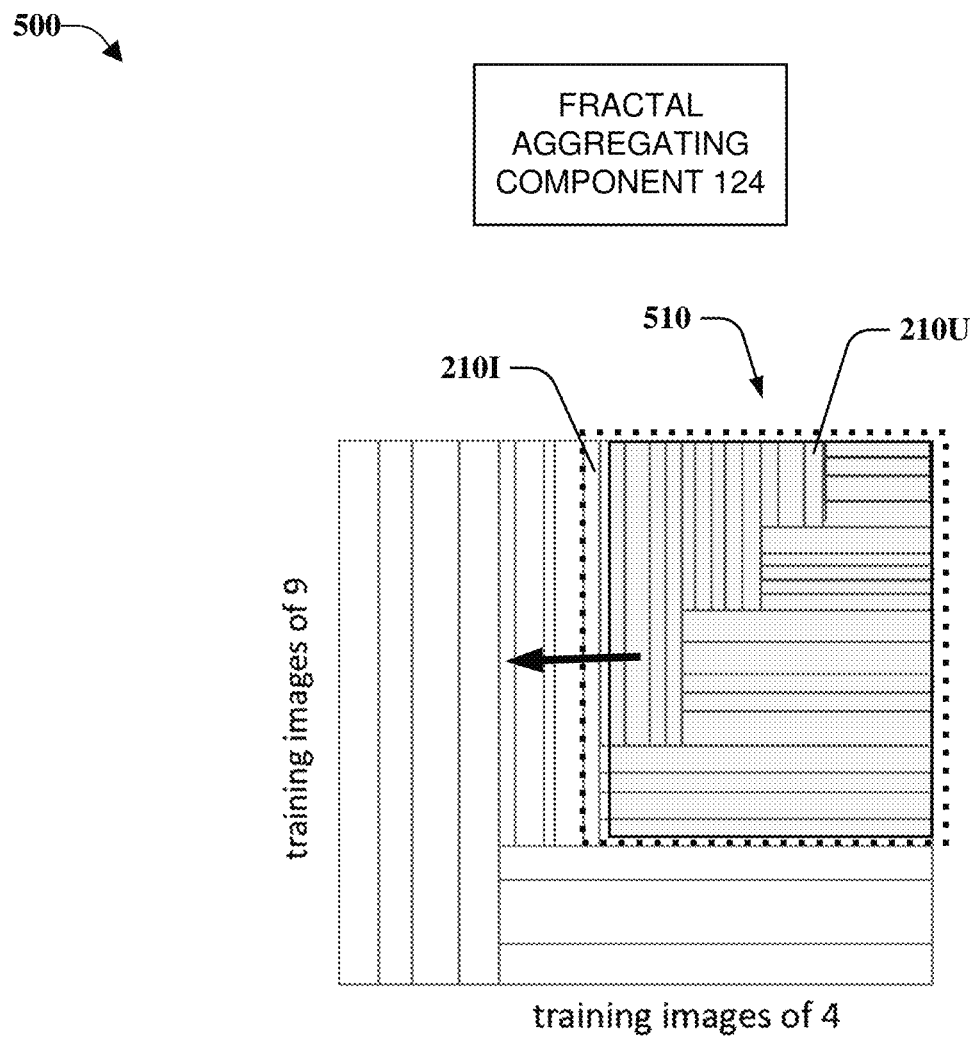
FIG. 5 illustrates a block diagram of an example that uses fractal aggregation to further combine the results of multiple classifiers, in accordance with one or more embodiments described herein.

FIG. 5 illustrates a block diagram of an example 500 that uses fractal aggregation to further combine the results of multiple classifiers, in accordance with one or more embodiments described herein. Repetitive description of like elements and processes employed in respective embodiments is omitted for sake of brevity.

FIG. 5 depicts the fractal aggregation process after the last classifier of level 4 is aggregated to the aggregated classifier. Based on completing the aggregation of level 4, FIG. 5 depicts aggregation of adjacent classifier 215I of level 3 an aggregated classifier that incorporates classifiers 215A-R and classifiers 210J-U, resulting in aggregated classifier 510. In this section, additional details of example approaches to combining classifiers into an aggregated classifier are provided, e.g., different approaches that can be used by fractal aggregating component 124 in one or more embodiments to generate output model 198 that can combine the output of multiple classifiers to yield an output of the aggregated classifier.

Returning to the example diagram of FIG. 4, one or more embodiments can use different evaluation approaches to either, select one result from the two different classifier 215A-B results or combine the two classifier results. It is important to note that the model that is selected to aggregate classifiers 215A-B (e.g., how the results from operation of individual classifiers are combined) is stored in output model 198 for use in integrating the results during operation of the two classifiers for different applications, e.g., for controlling vehicle 850, as described with FIG. 8.

In this example, one approach that can be used to evaluate and combine classifiers 215A-B is to use a vertical integration approach, e.g., implementations of this approach considering the size and type of data analyzed by the fractal aggregating component 124. In this example, because classifiers 215A-B are oriented vertically within level 10 as discussed above, an approach can be selected to handle the characteristics of their levels, e.g., level 10 and other evenly numbered level. The expressions (1)-(2) below respectively provide example approaches to combining classifier results for labels "4" and "9" for even level classifiers 215A-B:

$$w_{4,combined} = \min(w_{4,215A}, w_{4,215B}) \qquad (1)$$

$$w_{9,combined} = w_{9,215A}, w_{9,215B}) \qquad (2)$$

Similarly, when odd level classifiers are handled (e.g., 210A-B), expressions (3)-(4) below can be used in some circumstances to perform aspects of the aggregation, e.g., to provide example approaches to combining classifier results for labels "4" and "9" for odd level classifiers 210A-B:

$$w_{9,combined} = w_{4,210A}, w_{4,201B}) \qquad (3)$$

$$w_{9,combined} = \min(w_{9,210A}, w_{9,210B}) \qquad (4)$$

Stated differently, to derive the equations for the aggregating operations described herein, an operand can be analyzed as two bodies of evidence received and analyzed by classifiers 215A-B, e.g., some evidence against label I (e.g., a result of analysis by classifier 215A) as compared to some evidence against label II (e.g., a result of analysis by classifier 215B). In a first approach to combining the results of classifiers (e.g., 215A-B), the evidence against label I from both classifiers 215A-B has been derived from analysis by both classifiers of the same subset of data with label I, e.g., as depicted in FIG. 2. For example, classifiers 215A-B analyze the same subset of training data, e.g., a non-disjoint set of training data 192A. Based on this combination of training data analyzed by both classifiers 215A-B, one or more embodiments can combine the results of classifiers 215A-B by selecting the classifier results where the weight of evidence against label I is the strongest of the two classifier results. In one or more embodiments, this can occur because classifiers 215A-B (e.g., with different classifying algorithms in some examples) have analyzed the same subset of training data 192A (e.g., two overlapping bodies of evidence), and thus results of the better of the two classifiers can be selected to represent both classifiers 215A-B.

An example of this first approach to combining results of classifiers 215A-B is expression (1) above, e.g., whichever results from classifiers 215A-B has the least (e.g., the 'min' function) evidence in favor of label I is selected to represent a fractal aggregation of classifiers 215A-B for label I. In this example, expression (1) was selected based on classifiers 215A-B being of level 10, e.g., an even level with horizontally oriented fractal subsets of training data.

In a first approach to combining the results of classifiers (e.g., 215A-B), the evidence against label I from both classifiers 215A-B has been derived from analysis by both classifiers of disjoint subsets of data with label I, e.g., as depicted in FIG. 2. In this example, for the level 10 classifiers 215A-B, because classifiers 215A-B analyzed disjoint subsets of data with label II, to combine these results, instead of aggregating by selecting one of the results to represent both, as in expression (1) discussed above, one or more embodiments can aggregate by adding the weights of the two bodies of evidence against label II. Thus, as in expression (2) shown above, the result weights of each of classifiers 215A-B can be added together to represent a fractal aggregation of classifiers 215A-B for label II.

One having skill in the relevant art(s), given the descriptions herein, appreciates that for odd level classifiers 210A-U, aggregating results can utilize the second set of expressions above, and the classifiers analyze disjoint subsets of label I data and the same subset of label II data. It is important to note that the processes described herein for fractally aggregating the results of classifiers (e.g., adding together in some circumstances and taking a strongest value in others) are non-limiting, and other approaches can be selected based on implementation specific conditions.

It is also possible to generate a fractal aggregation model that is embodied as nested functions. In a non-limiting example, the outputs of an example fractal aggregation for a three-level fractal structure can be represented by the following, where subtasks with indices 1-4 are in the first level, 5-8 in the second level and 9-12 in the third level. In the expression below $w_I$ and $w_{II}$ refer to a measure of the weight of the evidence against a result classifying as label I and label II respectively, to an analyzed item.

$$w_1 = \sum_{i=1}^{4} w_{1,i} + \min\left(\min_{i=5}^{8} w_{I,i}, \sum_{i=9}^{12} w_{1,i}\right)$$

$$w_{I1} = \min\left(\min_{i=1}^{4} w_{I1,i}, \sum_{i=5}^{8} w_{I1,i} + \min_{i=9}^{12} w_{I,i}\right)$$

For binary classification, the above outputs can be the final outputs, and for multiclass classification, binary classifiers with different frames of discernment can be selected for aggregation, e.g., one or more embodiments can analyze evidence against the first label group in its frame of discernment and evidence against the second label group. In an example, for a label I, multiple bodies of evidence against it can be available, e.g., one assessment from each binary classifier where the frame of discernment involves label I. It should be noted that this process can be performed after the binary classifier results have been fractally aggregated, e.g., evidence against label I can have been derived from all training data with label I.

Thus, in some circumstances, multiple bodies of evidence against a label I classification can be overlapping, and one or more embodiments can thus determine the combined weight as the strongest of the weights. An example formula of this approach is provided below, where $wi_{label\ 1}$ refers to a negative of the weight of evidence for a label (1), "bin j" denotes one of the binary classifiers after fractal aggregation, and Fj and F'j can denote the two label groups in respective frames of discernment.

$$w_{label I} = \min\left(\min_{j|\epsilon F_j} w_{1,bin\ j},\ \min_{j|\epsilon F''_j} w_{I1,bin\ j}\right)$$

Stated in yet another way, in one or more embodiments, generating the unified result of the classifiers described above can include combining results of two classifiers of the group of classifiers based on the combinations of training data used to train the classifiers.

Figure 6:
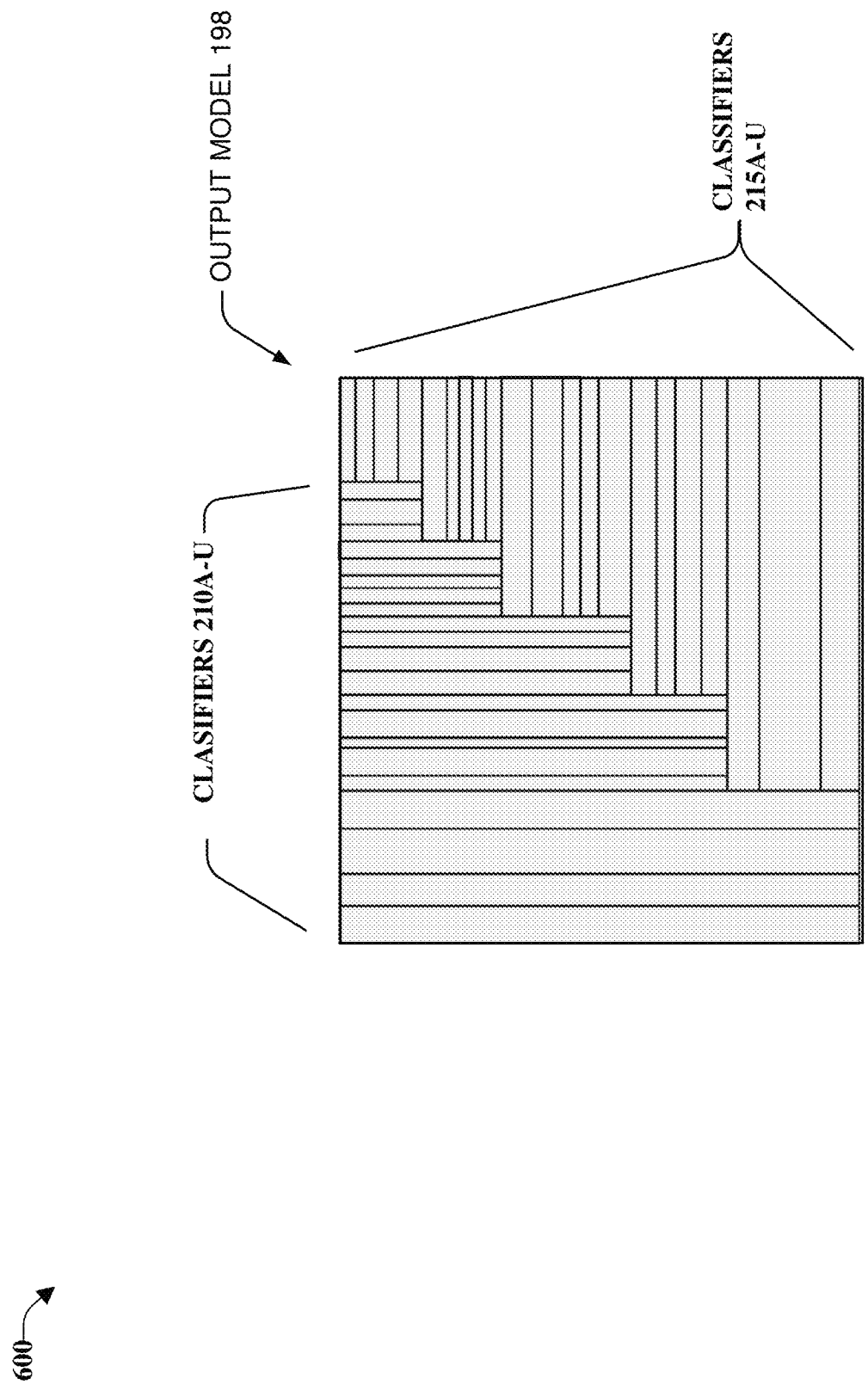
FIG. 6 illustrates a block diagram of an example that can use fractal aggregation to further combine the results of multiple classifiers, in accordance with one or more embodiments described herein.

FIG. 6 illustrates a block diagram of an example 600 that uses fractal aggregation to further combine the results of multiple classifiers, in accordance with one or more embodiments described herein. Repetitive description of like elements and processes employed in respective embodiments is omitted for sake of brevity.

In this example, the aggregation processes for the data sample subsets used to train classifiers has resulted in the results of all the classifiers being aggregated, e.g., given an input analyzed by all of the aggregated classifiers, a single result can be generated based on output model 198.

It should be noted that, after generation by processes described and suggested herein, output model 198 can be used in a production implementation of the classifiers modeled therein. For example, FIG. 8 describes an implementation where ensemble classifier component 880 can receive the output of the modeled classifiers and generate an aggregated result based on output model 198. In one or more embodiments, while output model 198 can be static after generation, output model 198 can also be dynamically modified to improve results, e.g., both the time the classifiers are trained with the selected training data subsets and after the model has been implemented (e.g., in vehicle 850) for use.

Figure 7A:
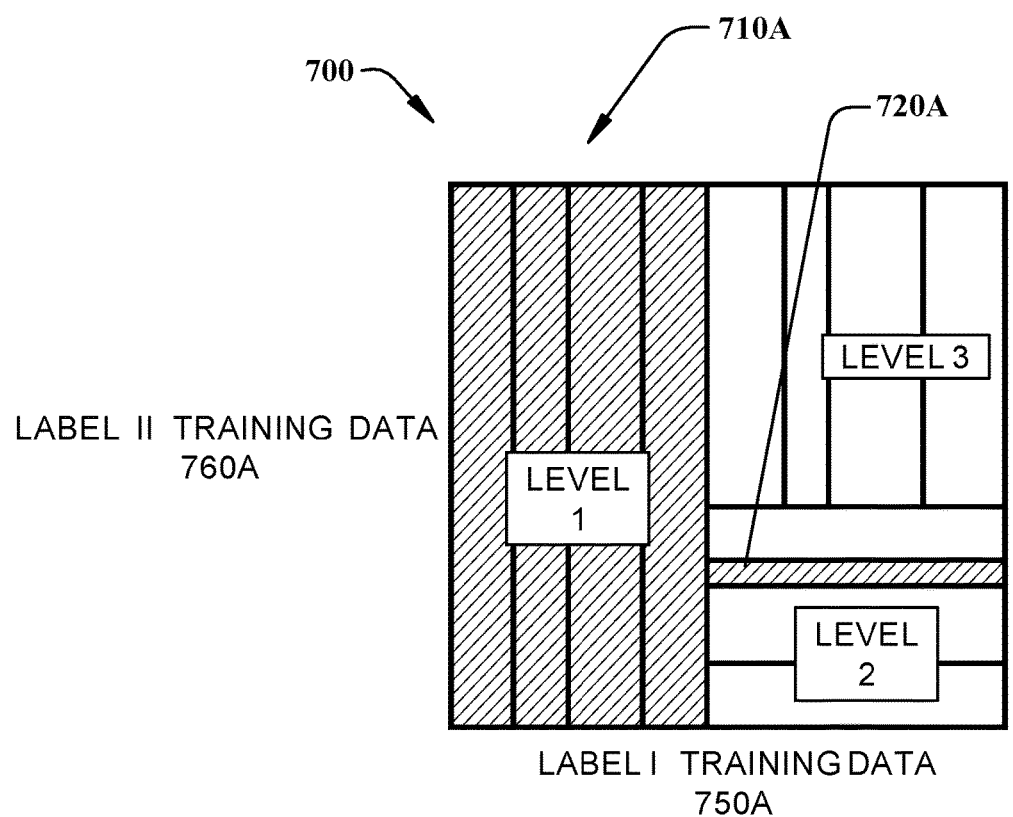
FIGS. 7A-7B illustrate a block diagram of an example that can use fractal aggregation to further combine the results of multiple classifiers, in accordance with one or more embodiments described herein.
Figure 7B:
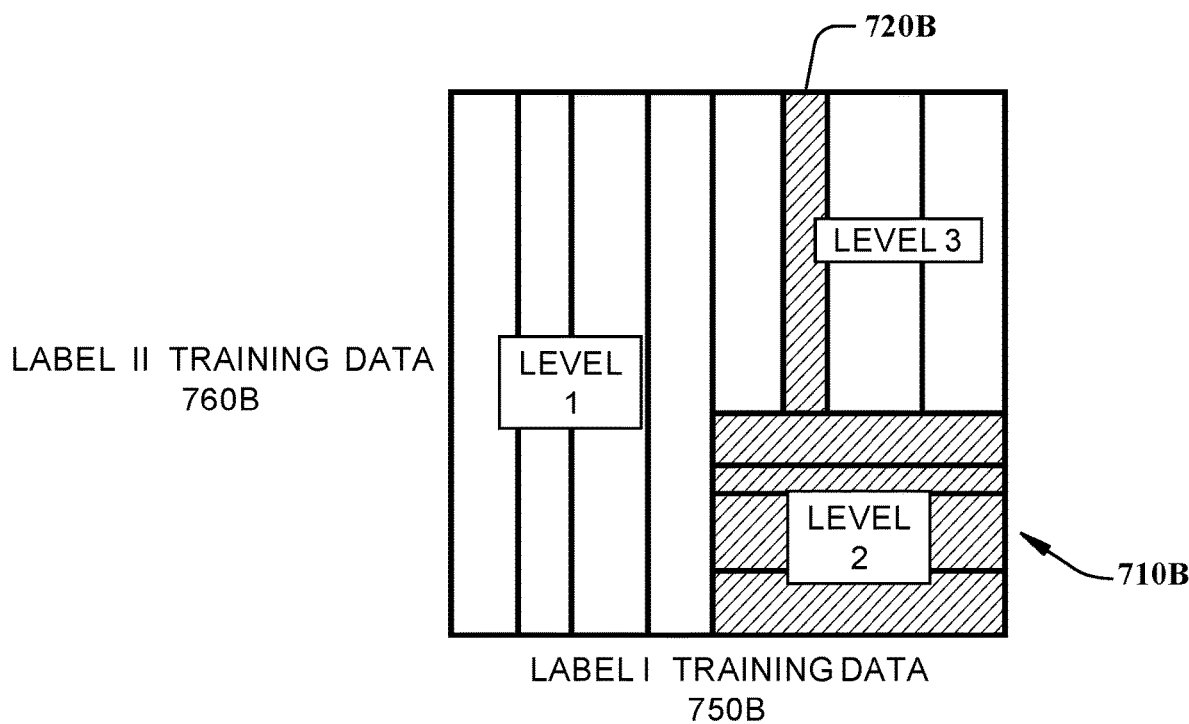

FIGS. 7A-7B illustrate a block diagram of an example 700 that can use fractal aggregation to further combine the results of multiple classifiers, in accordance with one or more embodiments described herein. As noted above, one of the advantages that one or more embodiments can have over existing approaches is the capability of evaluating and combining classifiers such that the accuracy of the final, combined result does not depend upon a large portion of the classifiers being in agreement, rather, different combinations of classifiers can provide accurate results such that accurate results by other classifiers are not employed.

One or more embodiments can term classifiers that are not employed for accurate results can be termed 'don't care' conditions or subtasks. Different types of combinations of classifiers that can provide accurate results are discussed further below. In a non-limiting example, classifiers can be termed 'don't care' classifiers when the results of other classifiers (e.g., all of the classifiers of a fractal level) are such that, because of testing data being divided by embodiments among classifiers for training, the results of the 'don't care' classifiers, however strong, are determined to not be relevant to an accurate final result.

As discussed with FIGS. 2-3 above, in one or more embodiments, any pair of fractally divided training data with opposite labels appears in one and only one training subset. Based on this, a training datum t with label I 750A can be contrasted against every training datum with label II 760A, and the contrast can be distributed among a set of subtasks. In FIG. 7A, this set of subtasks correspond to a vertical stack for classifier 710A of rectangles that collectively cover a vertical line at the x-coordinate that corresponds to t. The stack varies for different t, but can be matched to one of the don't-care conditions, e.g., it is composed of either one subtask in an odd level classifier 720A and all subtasks in the preceding even level for classifiers 710A, or, if the total number of levels is even, all subtasks in all even levels. Returning to the concept described above, in FIG. 7A, all classifiers are 'don't care classifiers' except for those in level 1 and the labeled subtask in the odd level classifiers 720A.

For example, as depicted in FIG. 7B, in one or more embodiments, for an input with label I 750B a condition is that one subtask classifier in an odd level (e.g., classifiers 720B of level 3) classifies correctly and that all subtask classifiers in the preceding even level (e.g., classifiers 710B of level 2) classify correctly. Alternatively, in a circumstance where the total number of levels is even (e.g., as depicted with FIG. 3) when all subtask classifiers in all even levels classify correctly, the aggregated result is correct, even if any or all of the odd level classifiers incorrectly classify. Similarly, as depicted in FIG. 7A, for an input with label II 760A, when at least one subtask classifier in an even level (e.g., classifiers 720A of level 2) classifies correctly, and that all subtask classifiers in the preceding odd level (e.g., classifiers 710A of level 1) classify correctly, then the correct result is generated by the aggregation of classifier results.

Figure 8:
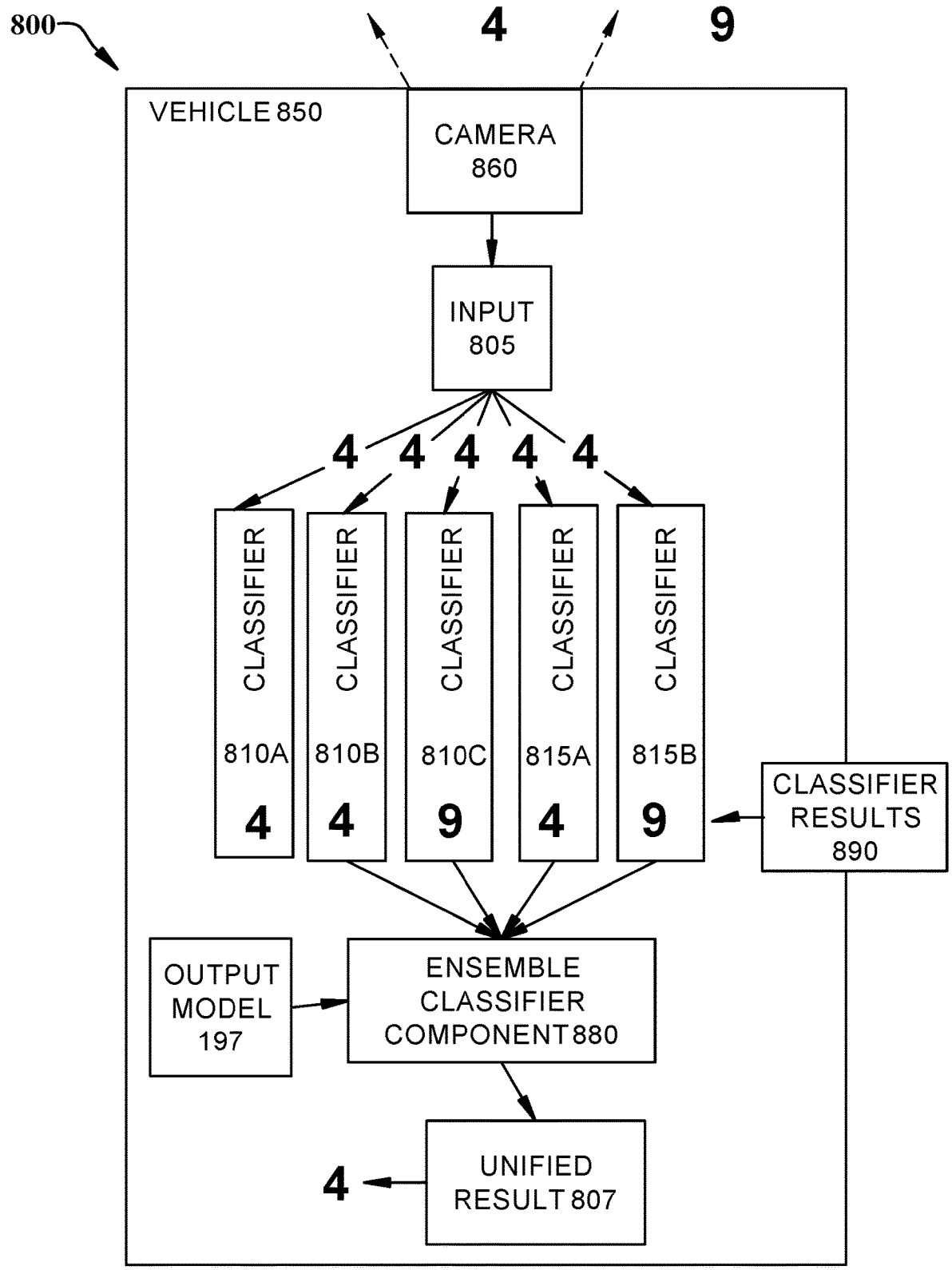
FIG. 8 depicts an example implementation of fractally aggregated classifiers in a vehicle, in accordance with one or more embodiments described herein.

FIG. 8 depicts an example 800 implementation of fractally aggregated classifiers in vehicle 850, in accordance with one or more embodiments described herein. Repetitive description of like elements and processes employed in respective embodiments is omitted for sake of brevity.

As noted in the problems with existing approaches described above, machine learning systems are becoming increasingly subject to adversarial challenges designed to increase the likelihood of inaccurate results. The example implementation in vehicle 850 illustrates the use of embodiments to potentially reduce the likelihood of success of adversarial actions in an implementation where inaccuracies can have significant results.

Model generating system 102, including fractal dividing of training sources by fractal dividing component 122 and fractal aggregation by fractal aggregating component 124, can provide technical improvements to systems, devices, components, operational steps, and/or processing steps associated with the various technologies discussed above and below with FIG. 8. For example, by facilitating the rapid (e.g., with a generated model) and accurate aggregation of multiple classifying components, one or more embodiments can improve the safety of machine learning applications, such as the examples discussed with vehicle 850. Moreover, by selecting particular subsets of training data for training multiple, aggregated classifying elements, one or more embodiments can help safeguard important machine learning applications (e.g., vehicle 850) from the adversarial challenges discussed in the Background above.

For example, adversarial actions against machine learning elements in the vehicle 850 context include the obscuring of particular common features of a road sign. One way in which one or more embodiments can address this problem is by the training of some subtask classifiers by subsets of training data that include the features, and some classifiers by subsets of training data that do not include the features, e.g., the latter group being trained to evaluate the representation of the road sign without weight being assigned based on the missing features.

In one or more embodiments, vehicle 850 can have camera 850 providing input 805 to each of classifiers 810A-C and 815A-B. It should be noted that, in this implementation, both classifiers 810A-C and 815A-B are included within system 800, with 810A-C corresponding to odd-level classifiers trained with all label II training data 760A and selected label I training data 750A, and 815A-B corresponding to even-level classifiers trained with all label I training data 750B, and selected label II training data 760B. These allocations are in accordance with the example operation of fractal dividing component 122 discussed with FIGS. 2-3 above.

In one or more embodiments, ensemble classifier component 880 can receive the result of the individual classifiers 810A-C and 815A-B and apply output model 198 to aggregate the results into unified result 807. With respect to an example implementation of one or more embodiments of ensemble classifier component 880 and output model 198, it should further be noted that, with respect to classifier results 890, given the same input 805, classifiers 810A-B and 815A classified correctly in this example, while classifiers 810C and 815B classified incorrectly.

In one or more embodiments, based on the description with FIGS. 7A-B above, in an example where classifiers 810A-B are all of the classifiers of level 1 (e.g., similar to classifiers 710A of FIG. 7A), classifiers 815A-B are classifiers in level 2 (e.g., with classifier 815A being similar to classifiers 720A of FIG. 7A), and classifier 810C is in level 3, even though two of the five classifiers were incorrect, unified result 807 provided to vehicle 850 will be correct.

It is to be appreciated that one or more embodiments described herein (e.g., model generating system 102, as well as other system components) perform functions that cannot be performed by a human (e.g., is greater than the capability of a single human mind). For example, an amount of data processed, a speed of data processed and/or data types of data processed by the system 100 over a certain period of time can be greater, faster, and different than an amount, speed, and data type that can be processed by a single human mind over the same period of time. This is especially true in the context depicted in FIG. 8, e.g., where vehicle 850 can utilize one or more embodiments to classify road signs during vehicle operation. One or more embodiments can also be fully operational towards performing one or more other functions (e.g., fully powered on, fully executed, etc.) while also performing the above-referenced functions and processes, e.g., including information that can be impossible to obtain manually by a user.

Figure 9:
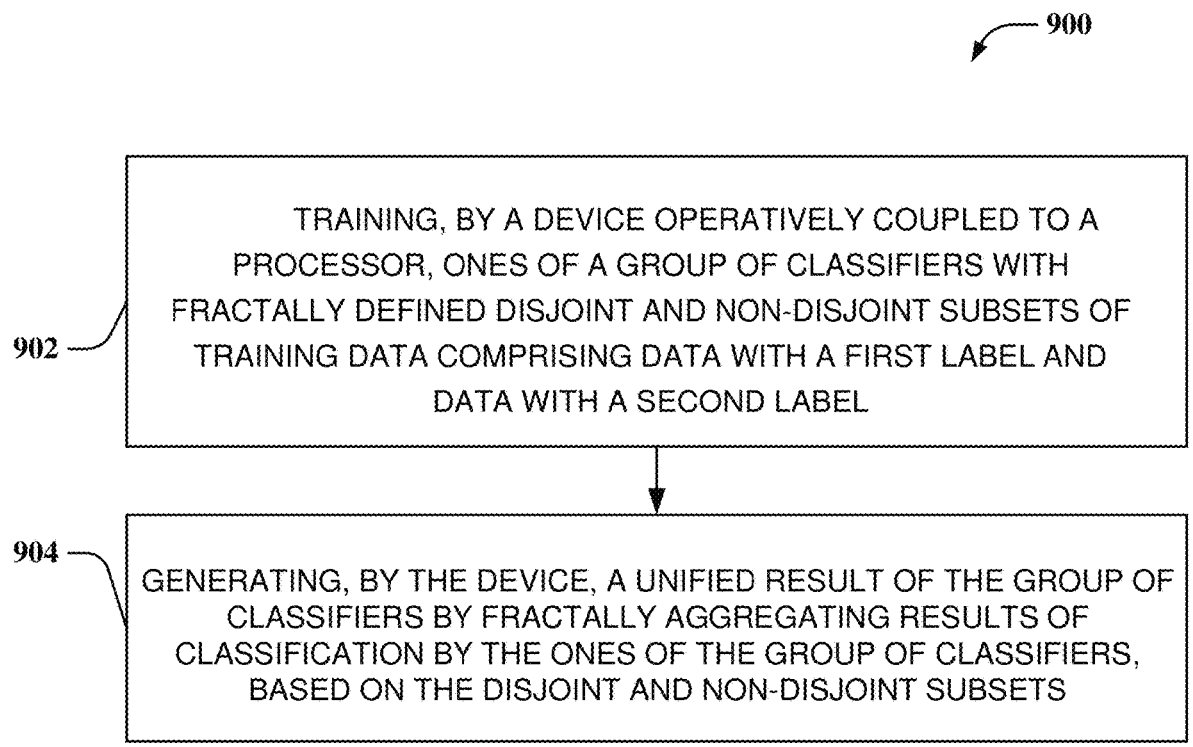
FIG. 9 illustrates a flow diagram of an example, non-limiting computer-implemented method that can facilitate dividing training data into subsets for allocation to specific classifiers for analysis, in accordance with one or more embodiments described herein.

FIG. 9 illustrates a flow diagram of an example, non-limiting computer-implemented method 900 that can divide and allocate training data to aggregate results of multiple classifiers of machine learning system, in accordance with one or more embodiments described herein. Repetitive description of like elements and processes employed in respective embodiments is omitted for sake of brevity.

At 902, computer-implemented method 900 can include training (e.g., via training component 126) by a device operatively coupled to a processor (e.g., processor 106 of model generating system 102), ones of a group of classifiers (e.g., classifiers 182) with fractally defined (e.g., via fractal dividing component 122) disjoint and non-disjoint subsets of training data comprising data with a first label and data with a second label. For example, in one or more embodiments, computer-implemented method 900 can include training by training component 126, ones of a group of classifiers 210A-U and 215A-U respectively trained with fractally defined disjoint images of label "4" and disjoint images of label "9" and non-disjoint images of label "9" and non-disjoint images of label "4."

At 904, computer-implemented method 900 can further include generating, by the device, a unified result (e.g., via ensemble classifier component 880) of the group of classifiers 182 by fractally aggregating (e.g., via fractal aggregation component) results of classification by the ones of the group of classifiers, based on the disjoint and non-disjoint subsets. For example, in one or more embodiments, computer-implemented method 900 can include utilizing fractal aggregating component 124 to aggregate results of classification of classifiers 215A-B, based on subsets of training data allocated to classifiers 215A-B by fractal dividing component 122, e.g., classifiers 215A-B are trained based on non-disjoint subsets of the training images of "4" of training data 192A and disjoint subsets of the training images of "9" of training data 192B.

At least in practical implementations, at scale, model generating system 102 can employ combinations of hardware and software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Model generating system 102 and/or components thereof, can be employed to solve new problems that arise through advancements in technologies mentioned above, employment of quantum computing systems, cloud computing systems, computer architecture, and/or another technology.

It is to be appreciated that, in one or more embodiments, model generating system 102 can utilize various combinations of electrical components, mechanical components, and circuitry that cannot be replicated in the mind of a human or performed by a human. As would be understood by one having skill in the relevant art(s), given the description herein, for practical implementations at scale the various operations that can be executed by model generating system 102 and components thereof, are greater than the capability of a human mind. For instance, the amount of data processed, the speed of processing such data, or the types of data processed by model generating system 102 over a certain period of time can be greater, faster, or different than the amount, speed, or data type that can be processed by a human mind over the same period of time.

According to several embodiments, model generating system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that model generating system 102 can include information that is impossible to obtain manually by an entity, such as a human user. For example, the type, amount, and/or variety of information included in model generating system 102, fractal dividing component 122, fractal aggregating component 124, training component 126 can be more complex than information obtained manually by a human user.

For simplicity of explanation, the computer-implemented methodologies are depicted and described as a series of acts. It is to be understood and appreciated that the subject innovation is not limited by the acts illustrated and by the order of acts, for example acts can occur in various orders and concurrently, and with other acts not presented and described herein. Furthermore, not all illustrated acts can be employed to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Model generating system 102 can comprise one or more computer and machine readable, writable, and executable components and instructions that, when executed by processor 106 (e.g., a classical processor, a quantum processor, etc.), can perform operations defined by such components and instructions. Further, in numerous embodiments, any component associated with model generating system 102, as described herein with or without reference to the various figures of the one or more embodiments described herein, can comprise one or more computer and machine readable, writable, and executable components and instructions that, when executed by processor 106, can perform operations defined by such components and instructions. For example, fractal dividing component 122, fractal aggregating component 124, training component 126, and any other components associated with model generating system 102 as disclosed herein (e.g., communicatively, electronically, operatively, and optically coupled with and employed by model generating system 102), can comprise such computer and machine readable, writable, and executable components and instructions. Consequently, according to numerous embodiments, model generating system 102 and any components associated therewith as disclosed herein, can employ processor 106 to execute such computer and machine readable, writable, and executable components and instructions to perform one or more operations described herein with reference to model generating system 102 and any such components associated therewith.

It should be noted that model generating system 102 can be associated with a cloud computing environment. For example, model generating system 102 can be associated with cloud computing environment 1150 described below with reference to FIG. 11 and one or more functional abstraction layers described below with reference to FIG. 12 (e.g., hardware and software layer 1260, virtualization layer 1270, management layer 1280, and workloads layer 1290).

Model generating system 102 and components thereof (e.g., fractal dividing component 122, fractal aggregating component 124, training component 126, etc.) can employ one or more computing resources of cloud computing environment 1150 described below with reference to FIG. 11 and one or more functional abstraction layers (e.g., quantum software, etc.) described below with reference to FIG. 12 to execute one or more operations in accordance with one or more of the embodiments described herein. For example, cloud computing environment 1150 and such one or more functional abstraction layers can comprise one or more classical computing devices (e.g., classical computer, classical processor, virtual machine, server, etc.), quantum hardware, and quantum software (e.g., quantum computing device, quantum computer, quantum processor, quantum circuit simulation software, superconducting circuit, etc.) that can be employed by model generating system 102 and components thereof to execute one or more operations in accordance with one or more of the embodiments described herein.

Figure 10:
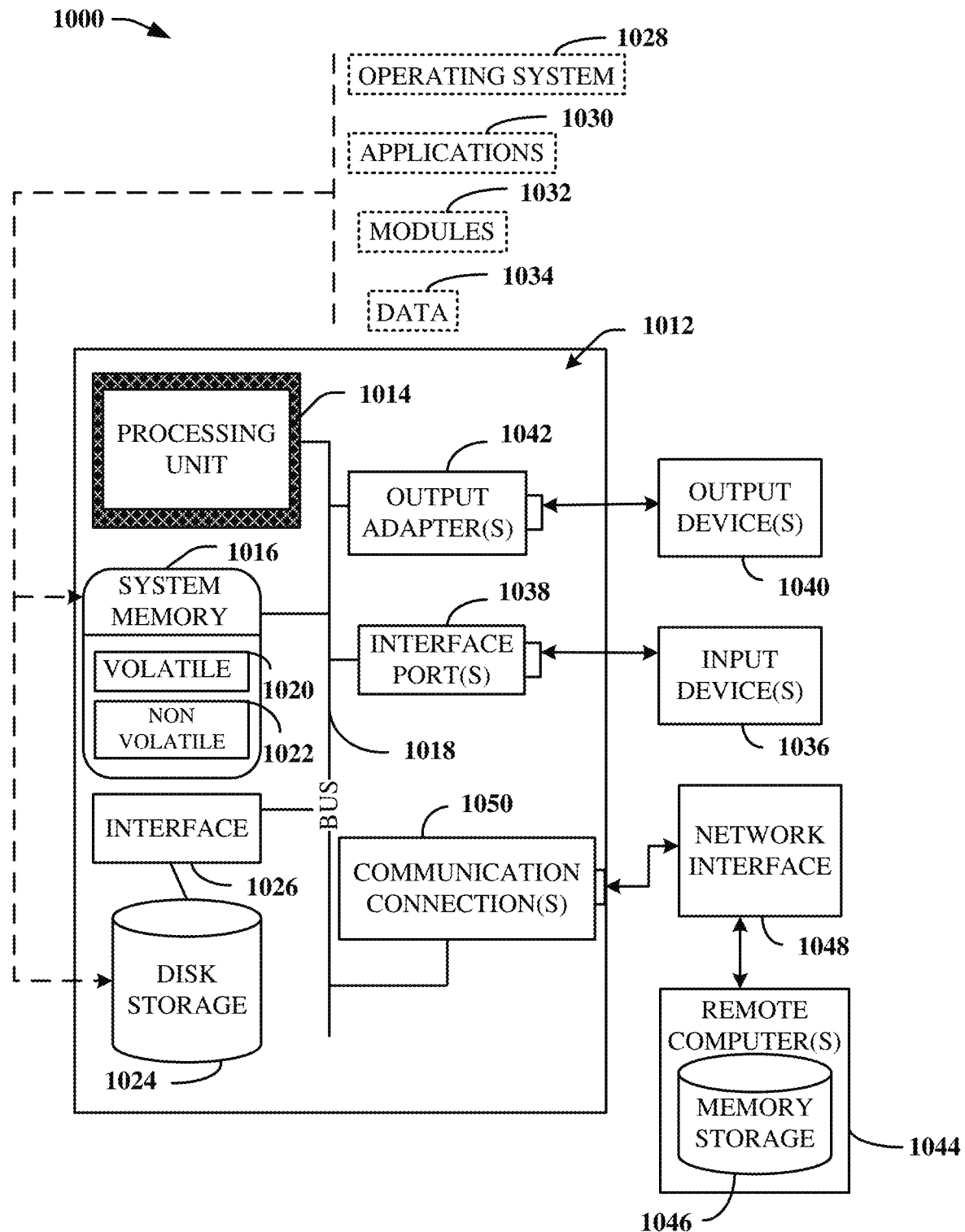
FIG. 10 illustrates a block diagram of an example, non-limiting operating environment in which one or more embodiments described herein can be implemented.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-80 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which can employ special adapters. The output adapters 1042 include, by way of illustration and not limitation, video and sound cards that provide a means of connection between the output device 1040 and the system bus 1018. It should be noted that other devices and systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
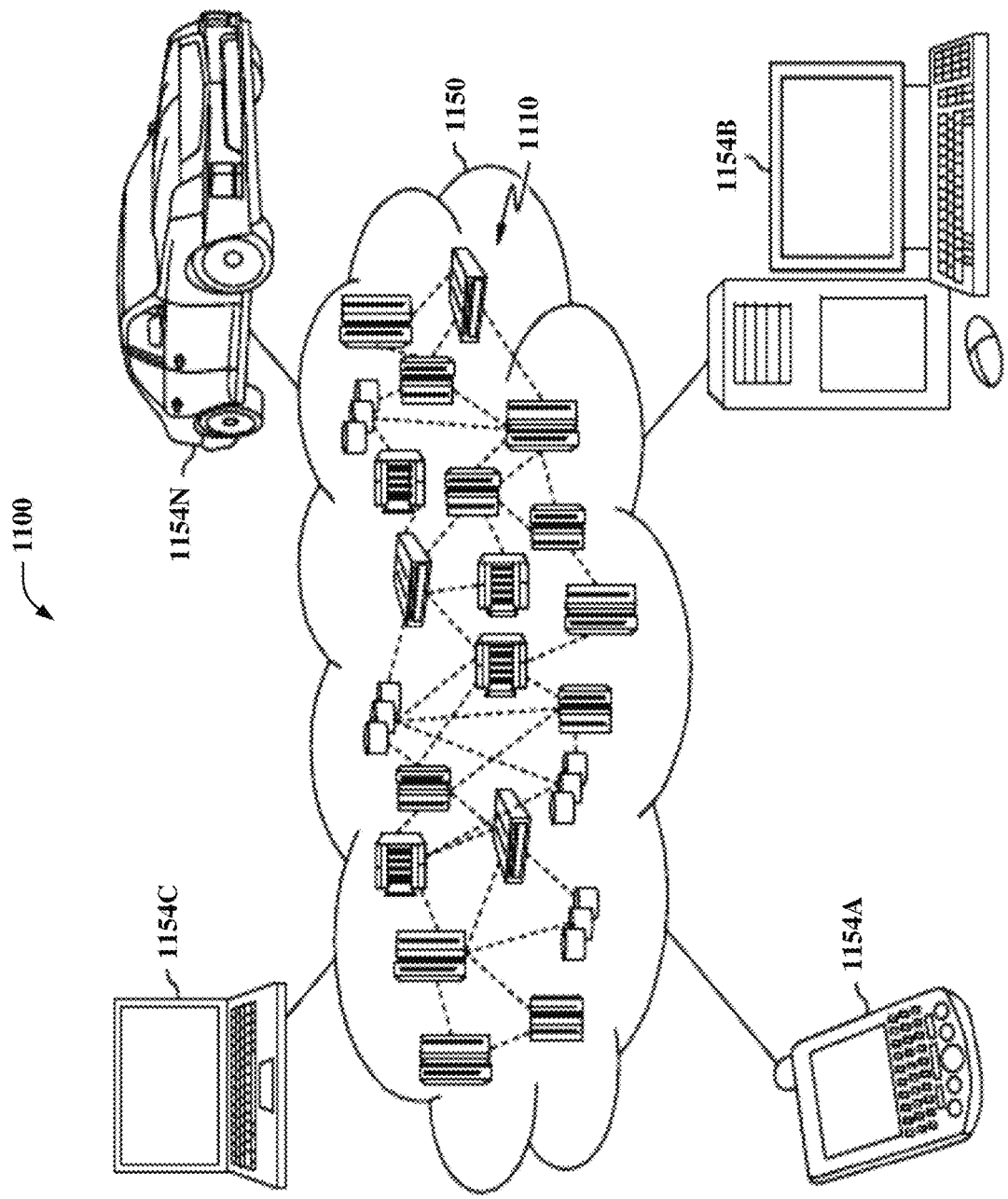
FIG. 11 illustrates a block diagram of an example, non-limiting cloud computing environment in accordance with one or more embodiments described herein.

Referring now to FIG. 11, an illustrative cloud computing environment 1150 is depicted. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and automobile computer system 1154N may communicate. Although not illustrated in FIG. 11, cloud computing nodes 1110 can further comprise a quantum platform (e.g., quantum computer, quantum hardware, quantum software, etc.) with which local computing devices used by cloud consumers can communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and network addressable connection (e.g., using a web browser).

Figure 12:
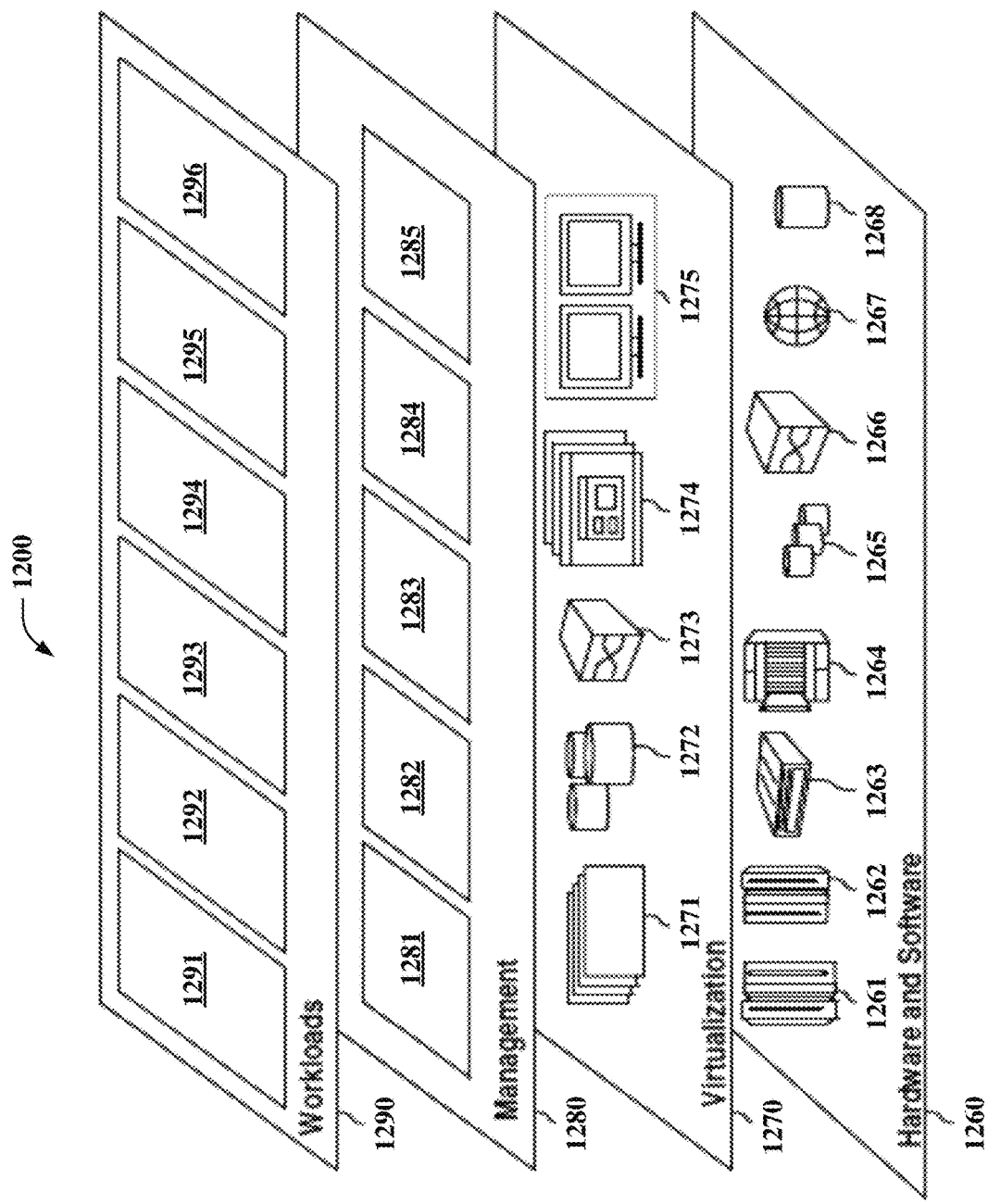
FIG. 12 illustrates a block diagram of example, non-limiting abstraction model layers in accordance with one or more embodiments described herein.

Referring now to FIG. 12, a set of functional abstraction layers provided by cloud computing environment 1150 is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267, database software 1268, quantum platform routing software (not illustrated in FIG. 12), and quantum software (not illustrated in FIG. 12).

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that certain service levels are met. Service Level Agreement (SLA) planning and fulfillment 1285 provide pre-arrangement for, and procurement of, cloud computing resources for which a future guideline is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and quantum state measurement logic software 1296.

The present invention may be a system, a computer-implemented method, an apparatus and a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and a wireless network. The network can comprise copper transmission cables, optical transmission fibers, wireless transmission, routers, firewalls, switches, gateway computers and edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and block diagrams of computer-implemented methods, apparatus (systems), and computer program products according to embodiments of the invention. It will be understood that each block of the flowchart illustrations and block diagrams, and combinations of blocks in the flowchart illustrations and block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, computer-implemented methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and computers, those skilled in the art will recognize that this disclosure also can or can be implemented in combination with other program modules. Generally, program modules include routines, programs, components, data structures, etc. that perform particular tasks and implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and thread of execution and a component can be localized on one computer and distributed between two or more computers. In another example, respective components can execute from various computer readable media having various data structures stored thereon. The components can communicate via local and remote processes such as in accordance with a signal having one or more data packets (e.g., data from one component interacting with another component in a local system, distributed system, and across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and "exemplary" are utilized to mean serving as an example, instance, or illustration. For the avoidance of doubt, the subject matter disclosed herein is not limited by such examples. In addition, any aspect or design described herein as an "example" and "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer-executable components; and
   a processor that executes the computer-executable components stored in the memory, wherein the computer-executable components comprise:
   a dividing component that trains ones of a group of classifiers with fractally defined disjoint and non-disjoint subsets of training data comprising first data with a first label and second data with a second label; and
   a fractal aggregating component that generates a unified result of the group of classifiers by fractally aggregating results of classification by the ones of the group of classifiers, based on the disjoint and the non-disjoint subsets.

2. The system of claim 1, wherein the disjoint and the non-disjoint subsets comprise:
   first subsets that train a first portion of the ones of the group of classifiers based on non-disjoint subsets of the training data with the first label and disjoint subsets of the training data with the second label; and
   second subsets that train a second portion of the ones of the group of classifiers based on non-disjoint subsets of the training data with the second label and disjoint subsets of the training data with the first label.

3. The system of claim 1, wherein the fractally defined disjoint and non-disjoint subsets of the training data comprise:
   first disjoint portions of the training data with the first label and first non-disjoint portions of the training data with the second label; and
   second disjoint portions of the training data with the first label and second non-disjoint portions of the training data with the second label.

4. The system of claim 3, wherein the fractally aggregating comprises recursively combining:
   first results of a first and a second classifier of the group of classifiers, wherein the first and second classifiers were trained based on the first disjoint portions; and
   second results of a third and a fourth classifier of the group of classifiers, wherein the third and fourth classifiers were trained based on the second disjoint portions.

5. The system of claim 1, wherein third results of the ones of the group of classifiers comprise a first measure of likelihood that an analyzed input comprises content of the first label and a second measure of likelihood that the analyzed input comprises content of the second label.

6. The system of claim 1, wherein generating the unified result comprises combining results of two classifiers of the group of classifiers based on combinations of training data used to train the two classifiers.

7. The system of claim 6, wherein the two classifiers were trained based on non-disjoint subsets of the first data, and wherein the unified result comprises results of one of the two classifiers to represent the two classifiers.

8. The system of claim 7, wherein the results of the one of the two classifiers were selected based on the results of the one classifier having a higher likelihood of the first label being correct than another of the two classifiers.

9. The system of claim 6, wherein the two classifiers were trained based on disjoint subsets of the first data, and wherein the unified result comprises a total of respective results of the two classifiers for the first label.

10. The system of claim 1, wherein a classifier of the group of classifiers comprises a neural network classifier.

11. A computer-implemented method, comprising:
    training, by a device operatively coupled to a processor, ones of a group of classifiers with fractally defined disjoint and non-disjoint subsets of training data comprising first data with a first label and second data with a second label; and
    generating, by the device, a unified result of the group of classifiers by fractally aggregating results of classification by the ones of the group of classifiers, based on the disjoint and the non-disjoint subsets.

12. The computer-implemented method of claim 11, wherein the disjoint subsets comprise:
    first subsets that train a first portion of the ones of the group of classifiers based on non-disjoint subsets of the training data with the first label and disjoint subsets of the training data with the second label; and
    second subsets that train a second portion of the ones of the group of classifiers based on non-disjoint subsets of the training data with the second label and disjoint subsets of the training data with the first label.

13. The computer-implemented method of claim 11, wherein the fractally defined disjoint and non-disjoint subsets of the training data comprise:
    first disjoint portions of the training data with the first label and first non-disjoint portions of the training data with the second label; and
    second disjoint portions of the training data with the first label and second non-disjoint portions of the training data with the second label.

14. The computer-implemented method of claim 11, wherein the results of the ones of the group of classifiers comprises a first measure of likelihood that an analyzed input comprises content of the first label and a second measure of likelihood that the analyzed input comprises content of the second label.

15. The computer-implemented method of claim 11, wherein generating the unified result comprises combining results of two classifiers of the group of classifiers based on combinations of training data used to train the two classifiers.

16. The computer-implemented method of claim 15, wherein the two classifiers were trained based on disjoint subsets of the first data, and wherein the unified result comprises a total of respective results of the two classifiers for the first label.

17. A computer program product that combines results of an ensemble of subtask classifiers, the computer program product comprising a non-transitory computer readable storage medium having program instructions embodied therewith, the program instructions executable by a processor to cause the processor to:
    train ones of the ensemble of subtask classifiers with fractally defined disjoint and non-disjoint subsets of training data comprising first data with a first classification and second data with a second classification; and
    generate a unified result of the ensemble of subtask classifiers by fractally aggregating results of classification by the ones of the ensemble of subtask classifiers, based on the disjoint and the non-disjoint subsets.

18. The computer program product of claim 17, wherein the disjoint subsets comprise:
    first subsets that train a first portion of the ones of the ensemble of subtask classifiers based on non-disjoint subsets of the training data with the first classification and disjoint subsets of the training data with the second classification; and
    second subsets that train a second portion of the ones of the ensemble of subtask classifiers based on non-disjoint subsets of the training data with the second classification and disjoint subsets of the training data with the first classification.

19. The computer program product of claim 17, wherein the results of classification by the ones of the ensemble of subtask classifiers comprises a first measure of likelihood that an analyzed input comprises content of the first classification and a second measure of likelihood that the analyzed input comprises content of the second classification.

20. The computer program product of claim 17, wherein fractally aggregating the results of the classification by the ones of the ensemble of subtask classifiers comprises combining the results of two subtask classifiers of the ensemble of subtask classifiers based on the training data used to train the two subtask classifiers.

\* \* \* \* \*